United States Patent
Riley et al.

[11] 3,720,602
[45] March 13, 1973

[54] WATER INJECTION IN A HYDRODESULFURIZATION PROCESS

[75] Inventors: Kenneth L. Riley; John D. Shoemaker, Jr., both of Baton Rouge, La.

[73] Assignee: Esso Research and Engineering Company

[22] Filed: Feb. 26, 1971

[21] Appl. No.: 119,222

[52] U.S. Cl................208/216, 208/217, 252/455 R, 252/456
[51] Int. Cl..............................................C10g 23/02
[58] Field of Search.............208/216, 217, 213, 215; 252/456

[56] References Cited

UNITED STATES PATENTS

| | | | |
|---|---|---|---|
| 2,946,738 | 7/1960 | Gardner et al. | 208/215 |
| 3,161,585 | 12/1964 | Gleim et al. | 208/216 |
| 3,475,324 | 10/1969 | Borst, Jr. | 208/213 |
| 3,196,104 | 7/1965 | Gleim et al. | 208/216 |
| 3,501,396 | 3/1970 | Gatsis | 208/216 |

FOREIGN PATENTS OR APPLICATIONS

| | | | |
|---|---|---|---|
| 3,820,364 | 10/1963 | Japan | 208/217 |

Primary Examiner—Delbert E. Gantz
Assistant Examiner—G. J. Crasanakis
Attorney—Pearlman and Schlager and Llewelyn A. Proctor

[57] ABSTRACT

Hydrodesulfurization of substantially non-metal containing hydrocarbon feed, such as vacuum gas oils, virgin gas oils and cycle oils, is carried out in a contacting step with hydrogen and a catalyst of a Group VI-B and/or Group VIII metal which also contains 0.1–15 percent be weight of a Group VB metal. Water, in the form of either liquid or vapor, is injected in the desulfurization reaction to effect cooling and to enhance catalyst activity.

19 Claims, 1 Drawing Figure

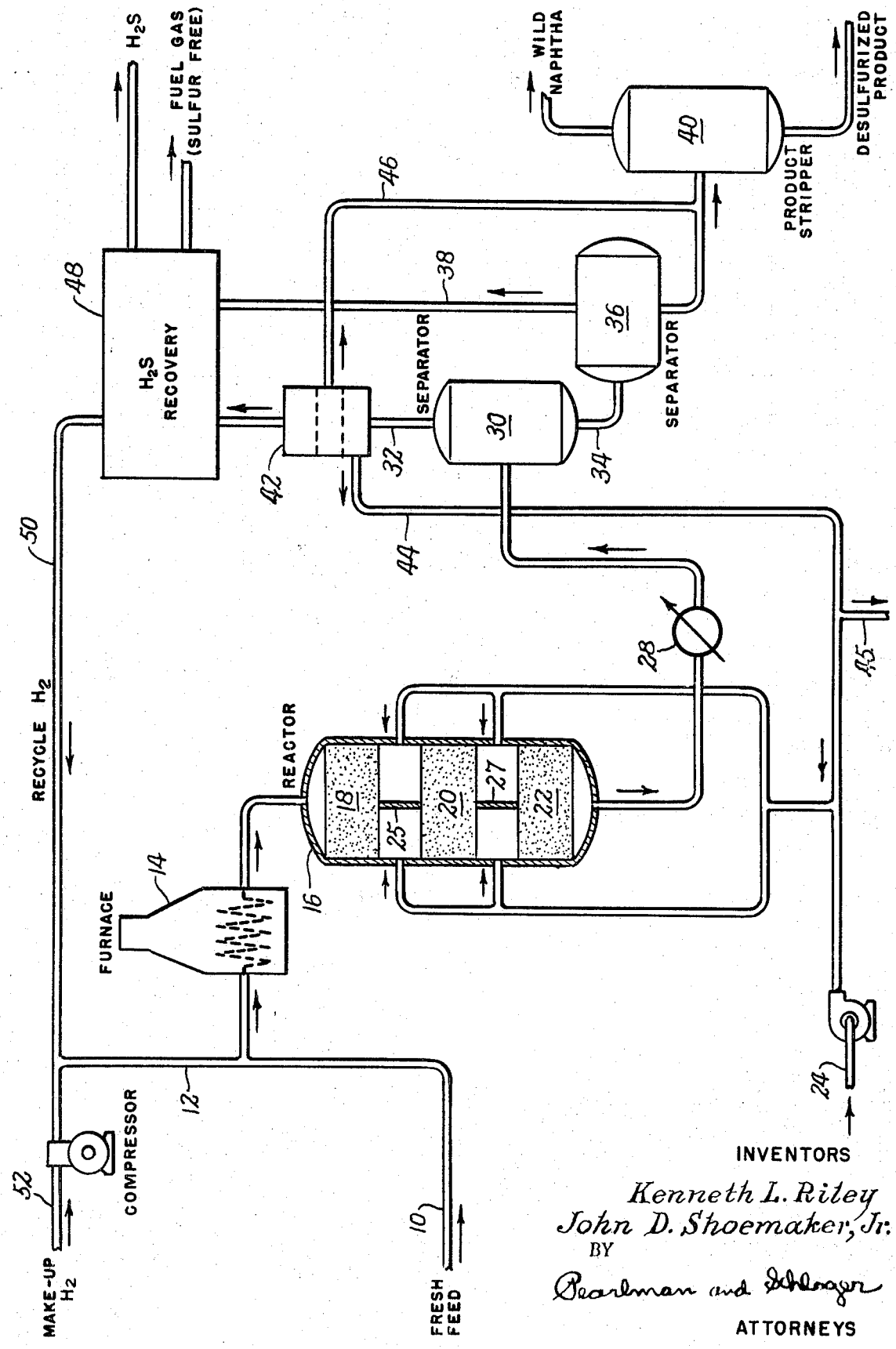

WATER INJECTION IN A HYDRODESULFURIZATION PROCESS

This invention relates to an improved process for hydrorefining petroleum crude oil feedstocks. More specifically, the present invention is directed to the catalytic hydrodesulfurization of substantially non-metal-containing, sulfur-bearing hydrocarbon feedstocks such as vacuum gas oils, virgin gas oils, thermal or catalytic cycle oils and the like.

Petroleum crude oil generally contains relatively large and detrimental amounts of hydrocarbons containing heteroatoms such as sulfur, oxygen and nitrogen. In some cases, these heterohydrocarbons exist in such great quantities that the heteroatom content, i.e., non-hydrocarbon content, runs as high as about 5 percent by weight. The presence of such compounds is undesirable because of their adverse effect both upon subsequent hydrocarbon refining operations as well as upon fuel performance.

Various techniques have been developed to remove these heterohydrocarbons from hydrocarbon feedstocks. Generally, hydrorefining processes such as hydrodesulfurization are employed. In the hydrodesulfurization reaction, the hydrocarbon feedstock together with a hydrogen-containing gas such as hydrogen, town gas, coke oven gas, low temperature distillation gas, water gas, gases obtained from refining or reforming mineral oils or other liquid fuels, final or recycle gases from syntheses using hydrogen and the like is passed over or through a catalyst at a temperature ranging from about 650° to about 850°F., whereby sulfur and other heteroatoms are substantially completely removed from the hydrocarbon stream.

The catalysts which have heretofore been employed for hydrorefining especially hydrodesulfurization are catalysts selected from Group VI B and/or Group VIII metals of the Periodic Table, generally in oxide or sulfide form. Thus, the catalytic composite may comprise one or more metallic components from the group of molybdenum, tungsten, chrominum, iron, cobalt, nickel, platinum, palladium, iridium, osmium, rhodium, ruthenium and mixtures thereof. The concentration of the catalytically active metallic component or components is primarily dependent upon the characteristics of the charge stock. For example, when Group VI B metals are employed, they are preferably present in amounts ranging from about 1.0 percent to about 20 percent by weight; whereas, the Group VIII metals are generally employed in amounts ranging from 0.2 percent to about 10 percent by weight. A preferred catalyst comprises a mixture of about 0.2 to about 10 percent by weight of cobalt or nickel and from about 1.0 percent to about 20 percent by weight molybdenum supported on a silica stabilized alumina support containing about 2 percent silica.

The carrier or support materials which are generally employed in conjunction with the catalyst are refractory inorganic oxide carriers such as alumina, silica, zirconia, magnesia, titania, boria, strontia, hafnia and mixtures of two or more of such materials including silica-alumina, silica-zirconia, silica-magnesia, silica-titania, alumina-zirconia, alumina-magnesia, alumina-titania, magnesia-zirconia, titania-zirconia-magnesia-titania, silica-alumina-zirconia, silica-alumina-magnesia, silica-alumina-titania, silica-magnesia-zirconia, silica-alumina-boria and the like. It is considered preferable to employ a carrier material containing at least a portion of silica and preferably a composite of alumina and silica with alumina being in the greater proportion.

It has heretofore been found that a savings of hydrogen required for hydrogenation can be realized by passing water vapor through the catalytic reactor employed for hydrorefining. The presence of the water vapor has also been found to increase the activity of the catalyst thereby enabling it to be employed over extended periods of time.

The advantages of water vapor injection have heretofore been limited, however, to the hydrorefining of residuum hydrocarbon feedstocks.

Accordingly, it is an object of the present invention to provide an improved hydrorefining process.

It is another object of the present invention to provide an improved hydrorefining process wherein the benefits of water vapor injection are realized for non-residuum hydrocarbon feedstocks.

It is still another object to provide a process wherein the addition of water vapor does not significantly affect catalyst deactivation, hydrogen consumption or product properties.

It is a still further object of the present invention to provide an improved hydrorefining catalyst system.

It is a still further object to provide a continuous means of quenching the hydrorefining reaction which is generally exothermic in nature. If this heat is not removed from the system, the reactor temperature would rise to a point where significant cracking of the hydrocarbon and catalyst deactivation would occur.

These as well as other objects are accomplished by the present invention which provides a catalytic hydrorefining process comprising admixing a substantially non-metal containing, hetero-atom-bearing hydrocarbon feed with hydrogen, contacting said admixture with a catalyst comprising compounds of the metals of Group VI B and/or Group VIII of the Periodic Table and from about 0.1 to about 15 percent by weight of a Group V B metal, thereby substantially reducing the heteroatom content of said hydrocarbon feedstream.

It has been found that the addition of water either as liquid or vapor to the reaction system of the present invention does not significantly affect catalyst deactivation, hydrogen consumption or product properties; moreover, the catalyst strength is uneffected. In fact, it has been found that employing the catalyst system of the present invention in combination with water injection improves catalyst activity when hydrorefining substantially non-metals containing sulfur-bearing hydrocarbon feeds such as vacuum gas oils as Safaniya, Tia Juana and the like, virgin gas oils, thermal or catalytic cycle oils and the like. The term "substantially non-metal containing" as employed in reference to the hydrocarbon feedstream is intended to define a feedstream containing less than about 25 p.p.m. of organometallic compounds, especially organometallic compounds of metals from Group V B of the Periodic Table.

The foregoing objects as well as further objects will become more apparent from the following detailed description of a preferred embodiment of the present invention, with reference to the appended drawing wherein is shown a simplified flow diagram of a hydrodesulfurization process in accordance with the present invention.

Referring now to the drawing, there is shown a substantially non-metals containing sulfur-bearing hydrocarbon feed 10, especially preferred of which is a virgin gas oil, or a catalytic cycle oil, being passed together with a hydrogen rich treat gas stream 12 to a preheat furnace 14 wherein the resulting feed stream is heated to a temperature ranging from about 550° to about 750°F. prior to being charged to the reactor 16. The heated feed stream 10 is passed downwardly through a multiple fixed bed reactor shown generally as 16. The several beds of the reactor designated representatively as 18, 20 and 22 respectively are comprised of a Group VI B and/or Group VIII metal to which a Group V B metal has been added in amounts ranging from 0.1 to about 15 percent by weight, and preferably in amounts of from 0.5 to about 10 percent by weight. The "Periodic Table of the Elements" referred to herein is that shown in the *Handbook of Chemistry and Physics*, 39th Edition, Chemical Rubber Publishing Co., Cleveland, Ohio (1957) pages 400–401, which is incorporated herein by reference. The catalysts are generally supported on an inorganic oxide base as for example, alumina stabilized with silica. A preferred catalyst is a mixture of cobalt or nickel and molybdenum supported on a silica stabilized alumina support. The catalyst can be presulfided in conventional manner either in situ or ex situ. These several catalyst beds within the reactor are separated one from the other and a quench stream 24 of water or steam or, if desired, hydrogen alone or as recycle gas, alone or in mixture with the water, is fed into the spaces between the beds and can be, if desired, directed against impingement baffles 25 and 27 in said spaces to assure even distribution of the quench stream over the catalyst bed.

In the hydrodesulfurization process, a large quantity of heat is released as a result of the exothermic reactions which occur. If this heat is not removed from the system, the reactor temperature can rise to a point where a significant cracking of the hydrocarbon stream and catalyst deactivation occur. Heretofore in an attempt to avoid these problems, cold quench gas, e.g., recycle gas, was injected between the catalyst beds to reduce the reactor temperature. This procedure was found expensive since the gas must be cooled, separated from the liquid, scrubbed to remove contaminants and recompressed before being injected into the reactor. It is considered preferable in the present process to employ liquid water as the cooling medium. The heat absorbed by the latent heat of vaporization of the water supplies the necessary cooling. The resulting steam has been found to increase catalyst activity. Generally from about 5 to about 50 percent by volume water can be employed to obtain the desired degree of heat removal. It has been found that this amount of water can raise catalyst activity 25 to about 50 percent.

The effluent from reactor 16 is partially cooled in cooling device 28 and passed to a high temperature, high pressure separator 30 wherein hydrogen, hydrogen sulfide and light ends are removed via line 32 and the desulfurized oil is then passed via line 34 to a high temperature-low pressure separator 36 for further removal of hydrogen, hydrogen sulfide and light ends via line 38. Desulfurized oil from the high temperature-low pressure separator 36 is then passed to stripper 40 wherein steam is injected for further separation of hydrogen sulfide and wild naphtha. The finished desulfurized oil product is removed as a bottoms product from the stripper.

The gaseous effluent from the high temperature-high pressure separator 30, i.e., hydrogen, hydrogen sulfide and light ends is fed via line 32 to a high pressure, cold separator and water disengaging drum 42 wherein the steam is condensed and recycled via line 44 to the reactor. A portion of the recycle quench stream can be withdrawn at line 45 and sent to a blowdown tank (not shown). Any entrained hydrocarbons can be separated within drum 42 and passed via line 46 to the stripper 40. The vaporous effluent from drum 42 is fed to a hydrogen sulfide recovery unit 48 wherein the hydrogen sulfide is removed by contact with a caustic scrubbing agent such as methyethylamine. The effluent from the scrubber, chiefly hydrogen and light ends, is recycled via line 50 with make-up hydrogen from line 52 to form the hydrogen rich treat gas which is passed via line 12 into admixture with the fresh feed and then sent to the reactor. A sulfur free fuel gas stream is also recovered. Thus, the products from the process of the present invention are: (1) essentially 100 liquid volume percent of the feed as desulfurized product, (2) a hydrogen sulfide stream of 95+ percent purity, (3) wild naphtha containing less than about 0.1 weight percent sulfur, and (4) a sulfur free fuel gas.

The reactor conditions which are maintained for efficient hydrodesulfurization generally require the reactor to be run at a pressure ranging from about 300 to about 3,000 psig. Preferably, however, the pressure is maintained within the reactor at from about 500 to about a 1,000 psig. The temperature within the reactor varies from the start of the run to the end of the run, generally ranging from about 650° to about 800°F. at the start of the run to about 850°F. at the end of the run. Preferably, however, the temperature within the reactor at the start of the run ranges from about 675° to about 710°F. rising to about 765°F. at the end of the run. Although lower or higher temperatures can be employed, it has been found that most economical operation dictates a temperature of around about 765°F. at the end of the run. The liquid hourly space velocity (LHSV) of the reactants within the reactor ranges from about 0.1 to about 10 and preferably ranges from about 0.5 to about 2. The composition of the hydrogen rich treat gas fed to the reactor, including both recycle and makeup hydrogen, generally ranges from about 50 to about 90 percent by volume of hydrogen, and preferably ranges from about 60 to about 80 percent hydrogen by volume. On a volume basis, from about 5 to about 50 percent water can be added to the reactor. Preferably, from about 10 to about 30 percent water can be added and has been found to effectively cool and yet increase catalyst activity. Although it is considered preferable to inject liquid water, it is equally possible to inject steam directly into the system and still obtain the benefits of increased catalyst activity.

Catalyst deactivation has heretofore been offset to an extent by periodically increasing the reactor temperature. The addition of water or steam has been found to offset catalyst deactivation at constant temperature. Thus, catalyst life can be significantly extended by combining water or steam injection with periodic increases in reactor temperature. When the temperature is increased, the steam addition can be reduced to a lower level and then gradually increased until the maximum steam addition is reached. Then the temperature can be raised and the cycle repeated again. In this manner, catalyst life can be significantly extended. It is also considered preferable when using either water or steam to condense the resulting steam and recover the water for recycling back to the reactor. If desired, instead of condensing the steam for recycle to the water quench sprays of the reactor, the steam can be condensed in a clean boiler to produce low pressure, i.e., about 125 psig. steam. Also, any light hydrocarbon stripped out can be removed at this point thus reducing hydrogen consumption in subsequent hydrotreating steps.

It has been found in the present invention that enhanced catalyst activity and extended catalyst life through injection of water either as a liquid or vapor can only be obtained when hydrorefining substantially non-metal containing, sulfur-bearing hydrocarbon feeds when the Group VI B and/or Group VIII metal catalyst contains from 0.1 to 15 percent by weight of a Group V B metal such as vanadium, niobium, tantalum and the like and most preferably, vanadium. Preferably, the Group V B metal is present in the catalyst system in a concentration ranging from about 0.5 to about 10 percent by weight. The dependency for obtaining the benefits of water or steam injection on the presence of a Group V B metal in the catalyst system to obtain enhanced catalyst activity is exemplified below.

A substantially non-metal containing, sulfur-bearing Safaniya vacuum gas oil feedstock was fed to a hydrodesulfurization system as shown in the drawing. The reactor contained multiple fixed beds of a catalyst comprising 3.5 percent by weight cobalt and 12.5 percent by weight molybdenum supported on a silica stabilized alumina support containing about 2 percent silica.

Table I below, summarizes the conditions within the reactor and the results obtained both with and without steam injection. Since previous data had indicated that the hydrodesulfurization of the particular feedstock followed a second-order kinetic rate expression, rate constants were calculated for the desulfurization occurring in each test.

TABLE I

| Reactor Conditions | | |
|---|---|---|
| Temperature, °F. | | 630 |
| Pressure, psig | | 800 |
| Inlet Gas (SCFB) | | |
| $H_2$ | | 1500 |
| $H_2O$ | 0 | 225 |
| Hydrodesulfurization (%) | 82.1 | 82.2 |
| Second Order Activity | 458 | 461 |

It can be seen that the addition of steam had essentially no effect on catalyst activity.

The above procedure was repeated except that 9.3 percent by weight vanadium and 2.9 percent by weight nickel have been added to the catalyst system described above.

Table II below summarizes the conditions within the reactor and the results obtained both with and without steam injection:

Table II

| Reactor Conditions | | |
|---|---|---|
| Temperature, °F. | | 710 |
| Pressure, psig | | 800 |
| Inlet Gas (SCFB) | | |
| $H_2$ | | 1500 |
| $H_2O$ | 0 | 225 |
| Hydrodesulfurization (%) | 59.4 | 64.9 |
| Second Order Activity | 117 | 148 |

It can be seen that in the presence of the catalyst system as modified in accordance with the present invention, the addition of steam increased catalyst activity from 117 to 148, an increase of over 25 percent.

Although specific materials and conditions were set forth in the above exemplary processes for hydrorefining non-metal containing, sulfur-bearing hydrocarbon feedstocks in accordance with this invention, these are merely intended as illustrations of the present invention. Various other catalyst systems, Group V B metals, reactor conditions and process sequences such as those described above may be substituted in the above examples with similar results.

Other modifications of the present invention will occur to those skilled in the art upon a reading of the present disclosure. These are intended to be included within the scope of this disclosure.

What is claimed is:

1. An improved catalytic hydrodesulfurization process comprising admixing, a substantially non-metal containing sulfur-bearing hydrocarbon feed selected from the group consisting of vacuum gas oils, virgin gas oils, thermal and catalytic cycle oils with hydrogen and contacting said admixture in a reaction zone with a catalyst comprising compounds of the metals of Group VI B and/or Group VIII of the Periodic Table and from about 0.1 to about 15 percent by weight of a Group V B metal, and injecting water into said reaction zone to effect cooling and to enhance catalyst activity thereby substantially reducing the sulfur content of the hydrocarbon feed stream.

2. Process as defined in claim 1 wherein the Group V B metal is present in amounts ranging from about 0.5 percent to about 10 percent by weight.

3. Process as defined in claim 1 wherein the catalyst comprises a mixture of a Group VB metal with cobalt or nickel and with molybdenum supported on a silica stabilized alumina support.

4. Process as defined in claim 1 wherein the Group V B metal is vanadium.

5. Process as defined in claim 1 wherein from about 5 percent to about 50 percent water is injected into the reaction zone.

6. Process as defined in claim 5 wherein the water is injected into the reaction zone as a liquid.

7. Process as defined in claim 5 wherein the water is injected into the reaction zone as a vapor.

8. An improved catalytic hydrodesulfurization process comprising admixing a substantially non-metal containing, sulfur-bearing hydrocarbon feed with hydrogen, feeding said admixture to a multi stage reaction zone containing within each stage a catalyst comprising compounds of the metals of Group VI B and/or Group VIII of the Periodic Table and from about 0.1 to about 15 percent by weight of a Group V B metal, injecting water between said stages to effect cooling of the reaction stream and to enhance catalyst activity, and thereafter separating the reaction products to obtain a hydrocarbon stream exhibiting substantially reduced sulfur content.

9. Process as defined in claim 8 wherein the pressure within the reaction zone ranges from about 300 to about 3,000 psig.

10. Process as defined in claim 9 wherein pressure within the reaction zone ranges from about 500 to about 1,000 psig.

11. Process as defined in claim 8 wherein the temperature within the reaction zone ranges from about 650° to about 800°F. at the start of the run to about 850°F. at the end of the run.

12. Process as defined in claim 11 wherein the temperature within the reaction zone ranges from about 675° to about 710°F. at the start of the run rising to about 765°F. at the end of the run.

13. Process as defined in claim 8 wherein the liquid hourly space velocity of the reaction system within the reaction zone ranges from about 0.1 to about 10.

14. Process as defined in claim 13 wherein the liquid hourly space velocity ranges from about 0.5 to about 2.

15. Process as defined in claim 8 wherein the hydrogen introduced into the reaction zone is a hydrogen-rich treat gas admixed with the hydrocarbon feed stream, said treat gas contains from about 50 percent to about 90 percent by volume of hydrogen.

16. Process as defined in claim 15 wherein the hydrogen-rich treat gas stream contains from about 60 percent to about 80 percent hydrogen by volume.

17. Process as defined in claim 8 wherein from about 5 percent to about 50 percent by volume of water is injected into the reaction zone.

18. Process as defined in claim 17 wherein from about 10 percent to about 30 percent by volume of water is injected into the reaction zone.

19. Process as defined in claim 8 wherein the temperature within the reaction zone is periodically increased to offset catalyst deactivation.

* * * * *